United States Patent
Tokunaga et al.

(10) Patent No.: US 6,674,763 B1
(45) Date of Patent: Jan. 6, 2004

(54) METHOD AND SYSTEM OF SEIZING COMMUNICATION CHANNEL ENHANCING USABILITY OF REMAINING COMMUNICATION CHANNELS

(75) Inventors: Seiji Tokunaga, Fukuoka (JP); Kazuhiro Muraoka, Fukuoka (JP); Junji Tagane, Fukuoka (JP); Norihito Nishimoto, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/482,711

(22) Filed: Jan. 13, 2000

(30) Foreign Application Priority Data

Jun. 8, 1999 (JP) .......................................... 11-160644

(51) Int. Cl.⁷ .............................. H04J 3/16; H04Q 7/20
(52) U.S. Cl. ....................... 370/437; 370/442; 455/455; 455/516
(58) Field of Search ................................ 370/329, 345, 370/347, 348, 437, 442, 443, 445; 455/450, 455, 509, 516, 422; 379/220.01, 221.01

(56) References Cited

U.S. PATENT DOCUMENTS

| | | | | |
|---|---|---|---|---|
| 3,634,627 A | * | 1/1972 | Velentini | 370/442 |
| 5,287,545 A | * | 2/1994 | Kallin | 455/422 |
| 5,471,645 A | * | 11/1995 | Felix | 455/516 |
| 5,594,944 A | * | 1/1997 | Ogata et al. | 455/516 |
| 6,292,551 B1 | * | 9/2001 | Entman et al. | 379/221.04 |

FOREIGN PATENT DOCUMENTS

| | | | |
|---|---|---|---|
| JP | 3-108845 | 5/1991 | |
| JP | 0630659 A | * 10/1994 | .......... H04Q/3/545 |
| JP | 6-303659 | 10/1994 | |
| JP | 9-271047 | 10/1997 | |

* cited by examiner

*Primary Examiner*—Chi Pham
*Assistant Examiner*—Afsar M. Qureshi
(74) *Attorney, Agent, or Firm*—Katren Muchin Zavis Rosenman

(57) ABSTRACT

A method and a system for seizing at least one communication channel for use in a first call. Information on a plurality of states of a plurality of communication channels are held in an channel-state-information holding unit. Based on the information on the states of the communication channels, at least one optimum communication channel from among the plurality of communication channels is determined as the at least one communication channel, and seized for use in the first call. The determination is made so that after the above determination and seizure for the first call, consecutive communication channels for use in a second call can be successfully seized with high probability. Further, when consecutive communication channels are required for the first call, and not immediately available, the at least one optimum communication channel may be secured by vacating one of the plurality of communication channels used in an existing call, and allocating an idle one of the plurality of communication channels to the existing call.

15 Claims, 11 Drawing Sheets

○ : IDLE COMMUNICATION CHANNEL
● : USED COMMUNICATION CHANNEL

METHOD AND SYSTEM OF SEIZING COMMUNICATION CHANNEL ENHANCING USABILITY OF REMAINING COMMUNICATION CHANNELS

BACKGROUND OF THE INVENTION (1) Field of the Invention

The present invention relates to a channel seizure system and a channel seizure method for seizing communication channels.

(2) Description of the Related Art

In the common channel signaling system, a dedicated circuit for transmission of signaling information for a plurality of speech circuits is provided separately from the plurality of speech circuits. The common channel signaling system enables various service functions such as functions of data exchange and remote maintenance of exchanges in addition to the conventional functions of telephone exchange, and these functions are currently realized, for example, in ISDN.

On the other hand, recently the world has entered the age of multimedia network, and demand for high-speed data transfer, video communication, and the like is growing. Therefore, it is expected that networks having a great capacity and a broad bandwidth and providing high-speed communication service are constructed.

In the common channel signaling system, the ITU-T recommendation Q.763 provides a channel seizure method for establishing a communication path which realizes high-speed communication by concurrently seizing a plurality of consecutive communication channels (i.e., a plurality of communication channels having consecutive channel numbers).

FIGS. 11A and 11B are provided for explaining the principle of the channel seizure method. In FIG. 11A, exchanges 100 and 200 are connected through a plurality of communication channels CH1 to CH10 and a signaling line DL, where the communication channels CH1 to CH10 are provided for transmitting user data, and each of the communication channels CH1 to CH10 has a bandwidth of 64 Kbps.

For example, when a bandwidth of 384 Kbps (=64 Kbps× 6) is required for a video conference, first, the exchange 100 sends a call request (for a multirate call using more than one communication channel) to the exchange 200 through the signaling line DL. At this time, the leading channel of the more than one communication channel for the multirate call is arbitrarily selected. In this example, it is assumed that the leading channel is the communication channel CH4. Then, the exchanges 100 and 200 seize six consecutive communication channels beginning from the communication channel CH4 (i.e., communication channels CH4 to CH9) to establish a communication path, as illustrated in FIG. 11B. Thus, the video conference can be held.

As described above, in order to perform communication with a broad bandwidth, a required number of consecutive communication channels are seized according to the type of information to be transmitted and the purpose of the communication.

However, according to the conventional channel seizure method, it is impossible to seize all of the required number of communication channels unless the required number of consecutive idle communication channels exist. That is, conventionally, idle communication channels located at intervals cannot be allocated to a single multirate call. This is because the ITU-T recommendation Q.763 specifies that communication channels for the multirate call are selected from consecutive idle communication channels.

For example, if the channel CH9 is used in another existing call when the above call request for a multirate call using six communication channels beginning from the channel CH4 is sent to the exchange, the exchange cannot seize six communication channels, since all of the consecutive communication channels CH4 to CH9 are not available due to the occupation of the communication channel CH9, and idle communication channels located at intervals, e.g., a set of the idle communication channels CH4 to CH8, and CH10, cannot be allocated to a single multirate call.

Therefore, conventionally, the above call request has to be repeated until the preoccupied channel CH9 becomes available. Thus, call loss is increased.

In spite of the above problem, conventionally, communication channels are seized regardless of usability of idle communication channels remaining after the seizure, and therefore communication channels cannot be used efficiently.

For example, if a channel CH10 is seized in response to a call request after communication channels CH4 to CH9 have been seized, it is still possible to establish a communication path for a further multirate call of a bandwidth corresponding to three communication channels since three consecutive communication channels CH1 to CH3 are still available.

Nevertheless, since conventionally usability of the remaining idle communication channels is not considered when a communication channel is seized for a call, for example, the channel CH1, instead of the above channel CH10, may be seized in response to the above call request after the communication channels CH4 to CH9 have been seized. In this case, the maximum length of the series of consecutive idle communication channels left for a further multirate call is two. Therefore, idle communication channels cannot be used efficiently.

SUMMARY OF THE INVENTION

An object of the present invention is to provide a channel seizure system in which channel allocation is optimized so that usability of idle communication channels in multirate calls is enhanced.

Another object of the present invention is to provide a channel seizure method by which channel allocation is optimized/so that usability of idle communication channels in multirate calls is enhanced.

According to the first aspect of the present invention, there is provided a channel seizure system having a source-side exchange and a destination-side exchange. In the channel seizure system, the source-side exchange contains a channel-state-information holding unit which holds information on a plurality of states of a plurality of communication channels, an optimum-channel determining unit which determines at least one optimum communication channel for use in a first call, from among the plurality of communication channels, based on the information on the plurality of states of the communication channels, a channel seizing unit which seizes the at least one optimum communication channel determined by the optimum-channel determining unit, and a source-side signaling control unit which transmits and receives signaling information. The above optimum-channel determining unit determines the at least one optimum communication channel for use in the first call so that a further operation of seizing consecutive communication channels for a second call can be successfully performed with high probability, after the optimum-channel determining unit determines the at least one optimum communication channel for the first call. The destination-side exchange in the channel seizure system contains a destination-side signaling control unit which transmits and receives the signaling information.

According to the second aspect of the present invention, there is provided a channel seizure method for seizing at least one communication channel for use in a first call. The channel seizure method includes the steps of: (a) holding information on a plurality of states of a plurality of communication channels; (b) determining, as the at least one communication channel for use in the first call, at least one optimum communication channel from among the plurality of communication channels, based on the information on the plurality of states of the communication channels; and (c) seizing the at least one optimum communication channel determined in step (b). The operation of step (b) is performed so that a further operation of seizing consecutive communication channels for a second call can be successfully performed with high probability, after the operations of steps (b) and (c) for the first call.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

In the drawings:

FIG. 4 is a diagram illustrating a configuration after completion of connections between the subscriber C and the communication channels in the exchange 100 through the mixing trunk 10a;

DESCRIPTION OF THE PREFERRED EMBODIMENTS (1) Basic Construction

The various aspects of the present invention are explained below with reference to drawings.

Figure 1A:
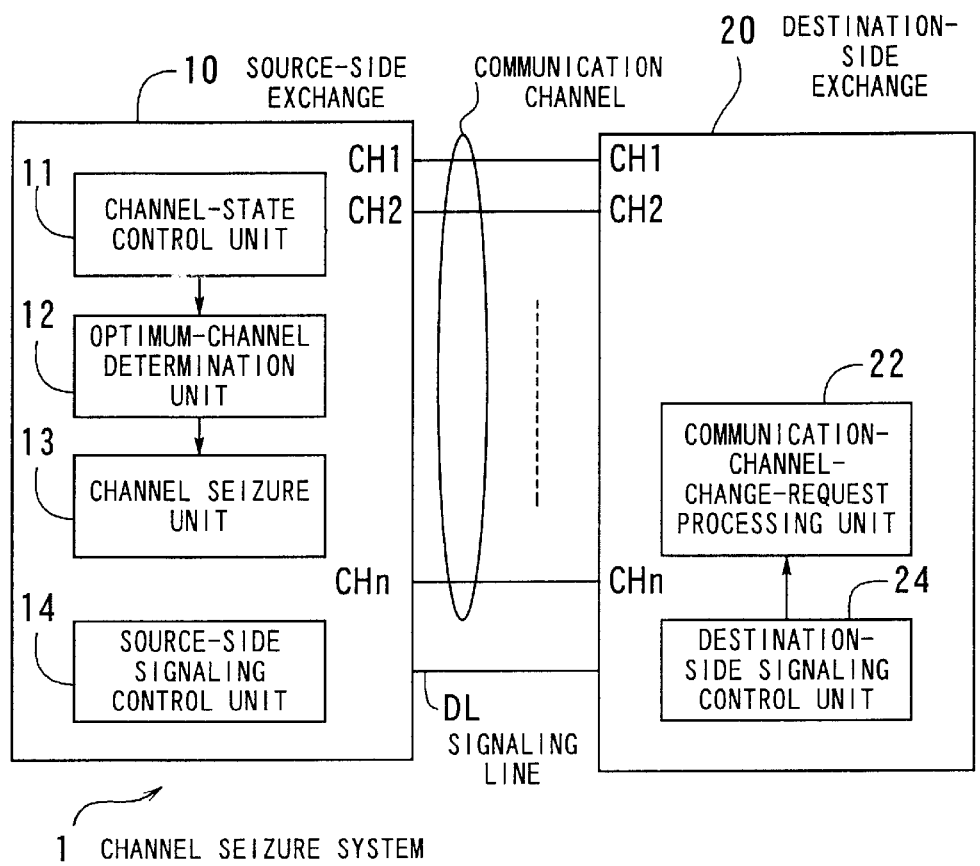
FIG. 1A is a block diagram illustrating the basic construction of the channel seizure system according to the present invention.

FIG. 1A is a block diagram illustrating the basic construction of the channel seizure system according to the first aspect of the present invention. The channel seizure system in FIG. 1A comprises a source-side exchange 10 and a destination-side exchange 20. The source-side exchange 10 and the destination-side exchange 20 are each have functions for realizing a common channel signaling system (e.g., the No.7 common channel signaling system), and are connected with each other through communication channels CH1 to CHn and a signaling line DL, where n is an integer greater than one.

The channel-state control unit 11 in the source-side exchange 10 holds channel-state information indicating whether each of the communication channels CH1 to CHn is occupied (used) or unoccupied (unused or idle), whether or not each of the communication channels CH1 to CHn is in a faulty condition, and the like.

When one or more communication channels are required to be seized for a first call, the optimum channel determination unit 12 in the source-side exchange 10 determines, based on the above channel-state information held in the channel-state control unit 11, one or more optimum communication channels so that a further operation of seizing consecutive communication channels for a second call can be successfully performed with high probability, after the current operation of determining and seizing the one or more communication channels for the first call.

The channel seizure unit 13 seizes the one or more optimum communication channels determined by the optimum-channel determination unit 12. The source-side signaling control unit 14 controls operations of transmission and reception of signaling information relating to communication channel control and other service.

Figure 1B:
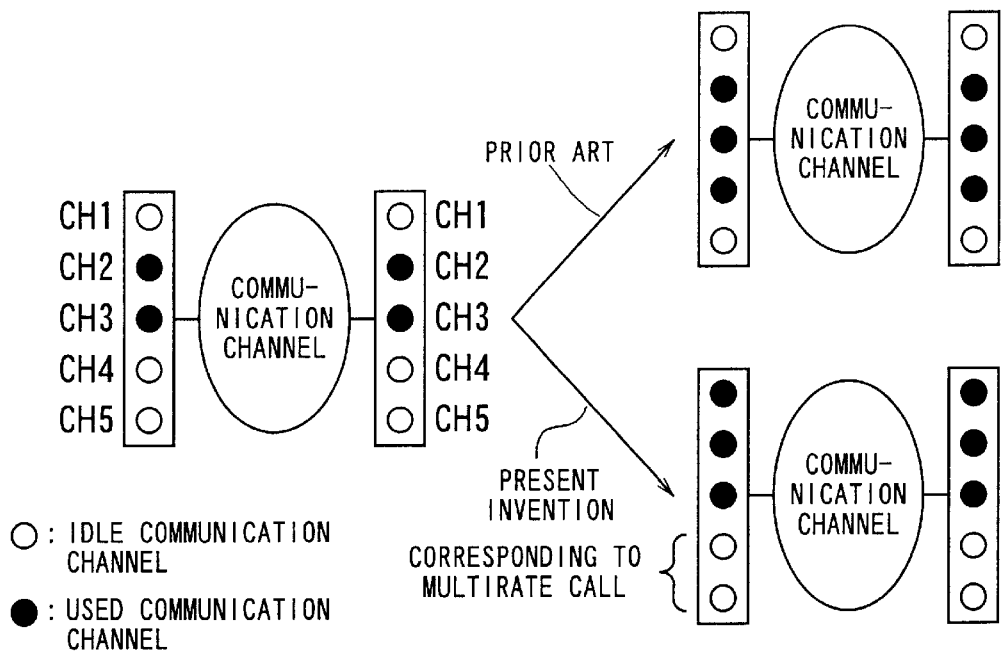
FIG. 1B is an explanatory diagram illustrating an example of the operation of the present invention in comparison with the conventional technique.

FIG. 1B is an explanatory diagram illustrating an example of operations of the present invention. In this example, it is assumed that initially the communication channels CH2 and CH3 are used, and thereafter a call request for another channel is originated from the source side. In the example of FIG. 1B, the integer n in FIG. 1A is assumed to be five.

If the conventional channel seizure method is executed in the above situation, an arbitrary one of the idle communication channels CH1, CH4, and CH5 is seized. If the communication channel CH1 is seized, the consecutive communication channels CH4 and CH5 remain unused. Therefore, if a further request for a multirate call using two channels is originated after the seizure of the communication channel CH1, the remaining communication channels CH4 and CH5 are available for the request for the multirate call.

However, if the communication channel CH4 or CH5, instead of the communication channel CH1, is seized in response to the above request for one channel, only discrete communication channels, the communication channel CH1 and one of the communication channels CH4 and CH5, remain unused. That is, consecutive communication channels do not remain unused.

On the other hand, according to the present invention, the optimum-channel determination unit 12 determines an optimum communication channel so that after the operation of determining and seizing the one or more communication channels for the currently requested call, a further operation of seizing consecutive communication channels for a further call can be successfully performed with high probability.

In this case, the optimum-channel determination unit 12 determines the channel CH1 as the above optimum communication channel, from among the communication channels CH1, CH4, and CH5. Therefore, the consecutive communication channels CH4 and CH5 remain unused, and are available for a further multirate call using two communication channels.

As described above, according to the present invention, one or more communication channels to be seized are determined so that after the operation of determining and seizing the one or more communication channels for the currently requested call, a further operation of seizing consecutive communication channels for another call can be successfully performed with high probability, i.e., usability of consecutive communication channels for a multirate call after the currently requested call is enhanced. Thus, as a whole, communication channels can be used more efficiently.

In addition to the above function, when a required number of consecutive communication channels cannot be seized by the above operation in response to a request for a multirate call, the optimum-channel determination unit 12 may secure the required number of consecutive communication channels by changing allocation of at least one communication channel to a currently existing call so as to vacate the at least one of communication channels used for the currently existing call and allocate at least one of idle communication channels to the currently existing call.

When there are a plurality of ways (options) of changing allocation of a communication channel to the existing call, one of the plurality of ways may be selected so that used communication channels gather together into a first group of consecutive communication channels, and idle communication channels gather together into a second group of consecutive communication channels. For example, it is possible to locate the group of used communication channels on the higher-number side and the group of unused communication channels on the lower-number side, as explained later in detail.

Referring back to FIG. 1A, the communication-channel-change-request processing unit 22 in the destination-side exchange 20 changes allocation of the communication channel in response to a channel-change request received from the optimum-channel determination unit 12 in the source-side exchange 10.

In the case of changing allocation of the communication channel, an idle communication channel generated by the above change is treated as a reserved channel, in order to prevent the idle communication channel from being used for another call, as explained later in detail.

The destination-side signaling control unit 24 in the destination-side exchange 20 controls operations of transmission and reception of signaling information relating to communication channel control and other service.

Although not shown, in practice, each of the exchanges 10 and 20 may have all of the channel-state control unit, the optimum-channel determination unit, the channel seizure unit, the source-side signaling control unit, the communication-channel-change-request processing unit, and the destination-side signaling control unit.

(2) First Embodiment

Figure 2:
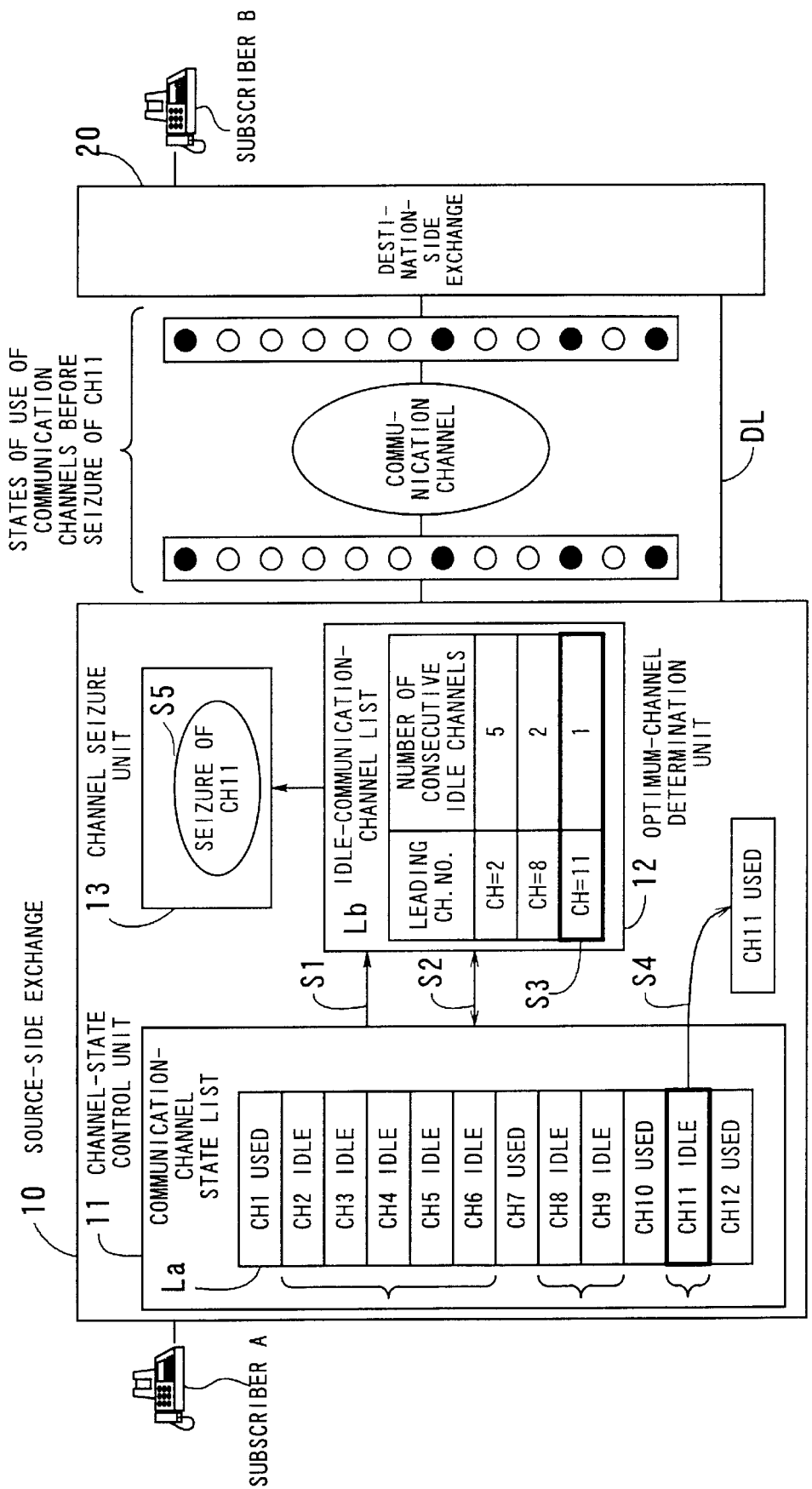
FIG. 2 is a block diagram illustrating the construction and the operations in the first embodiment of the present invention.

Next, referring to FIG. 2, operations for determining optimum communication channels are explained in detail. FIG. 2 is a diagram provided for explaining the operations of determining optimum communication channels in the first embodiment of the present invention.

First, a subscriber A connected to the source-side exchange 10 originates a call to a subscriber B connected to the destination-side exchange 20 through the signaling line DL.

[Step S1]

The channel-state control unit 11 contains a communication-channel state list La. When the channel-state control unit 11 in the source-side exchange 10 receives a request for seizure of a communication channel for the call from the subscriber A, the channel-state control unit 11 refers to the communication-channel state list La to determine whether or not an idle communication channel exists.

The communication-channel state list La contains entries for communication channels and indications of their (used or unused) states. In the example of FIG. 2, communication channels CH1, CH7, CH10, and CH12 are currently used, and the other communication channels are in an unused (idle) state.

In this case, the channel-state control unit 11 notifies the optimum-channel determination unit 12 that an available idle communication channel exists.

Regarding the case wherein no idle communication channel is available, explanations are explained later with reference to FIG. 3.

[Step S2]

The optimum-channel determination unit 12 produces an idle-communication-channel list Lb by referring to the communication-channel state list La.

The idle-communication-channel list Lb contains entries storing, for each series of consecutive idle communication channels, a leading channel number and the number of the consecutive idle communication channels, where the leading channel number indicates the channel number of the leading channel of each series of consecutive idle communication channels.

In this example, the number of the consecutive idle communication channels beginning from the leading channel CH2 is five, the number of the consecutive idle communication channels beginning from the leading channel CH8 is two, and the number of the consecutive idle communication channels beginning from the leading channel CH11 is one.

[Step S3]

Since, in this case, only one communication channel is required, the optimum-channel determination unit 12 searches for a communication channel in the idle-communication-channel list Lb. In this example, the communication channel CH11 is determined to be a communication channel which should be seized. This determination is made so as to leave as long a series of consecutive communication channels as possible for a subsequent request for a multirate call.

[Step S4]

The channel-state control unit 11 changes the state indication of the communication channel CH11 in the communication-channel state list La, from an idle state to a used state.

[Step S5]

The channel seizure unit 13 controls an operation of seizing the communication channel CH11.

Otherwise, in the case wherein the required number of consecutive communication channels is two, the optimum-channel determination unit 12 refers to the idle-communication-channel list Lb to determine whether or not two consecutive idle communication channels exist. As illustrated in FIG. 2, generally, it is possible to seize two consecutive idle communication channels from either of the series of consecutive communication channels beginning from the communication channels CH2 and the series of consecutive communication channels beginning from the communication channels CH8. However, according to the present invention, determination of two consecutive communication channels which should be seized is made so as to maximize the length of the remaining series of consecutive communication channels. Therefore, in the above case, the optimum-channel determination unit 12 determines, as the communication channels to be seized, the communication channels CH8 and CH9 in the series of consecutive communication channels beginning from the communication channel CH8. Thus, the series of consecutive idle communication channels beginning from the communication channel CH2 remain available for a further multirate call which requires not more than five channels.

(3) Second Embodiment

Next, referring to FIGS. 3 to 6, explanations are provided for operations in the case wherein an available series of consecutive idle communication channels does not exist when a request for a multirate call is received. FIGS. 3 to 6 are provided for explaining the operations of determining optimum communication channels in the second embodiment of the present invention when there is no series of consecutive idle communication channels which are immediately available for a requested multirate call.

In the following example, when the source-side exchange 10 cannot find a required series of (three) consecutive communication channels in the communication-channel state list La, the required series of (three) consecutive communication channels is secured by changing allocation of a communication channel to a currently existing call between subscribers C and D, from a communication channel (CH6) currently used for the existing call to one of idle communication channels (CH2). Details of the operations are as follows.

First, the subscriber A connected to the source-side exchange 10 originates a multirate call to the subscriber B connected to the destination-side exchange 20, where the multirate call requires three communication channels.

[Step S10]

In the second embodiment, the communication-channel state list La contains four blocks each containing entries for three communication channels. When the channel-state control unit 11 in the source-side exchange 10 receives a request for seizure of three communication channels for the multirate call, the channel-state control unit 11 refers to the communication-channel state list La for searching for three consecutive idle communication channels in each of the four blocks.

Figure 3:
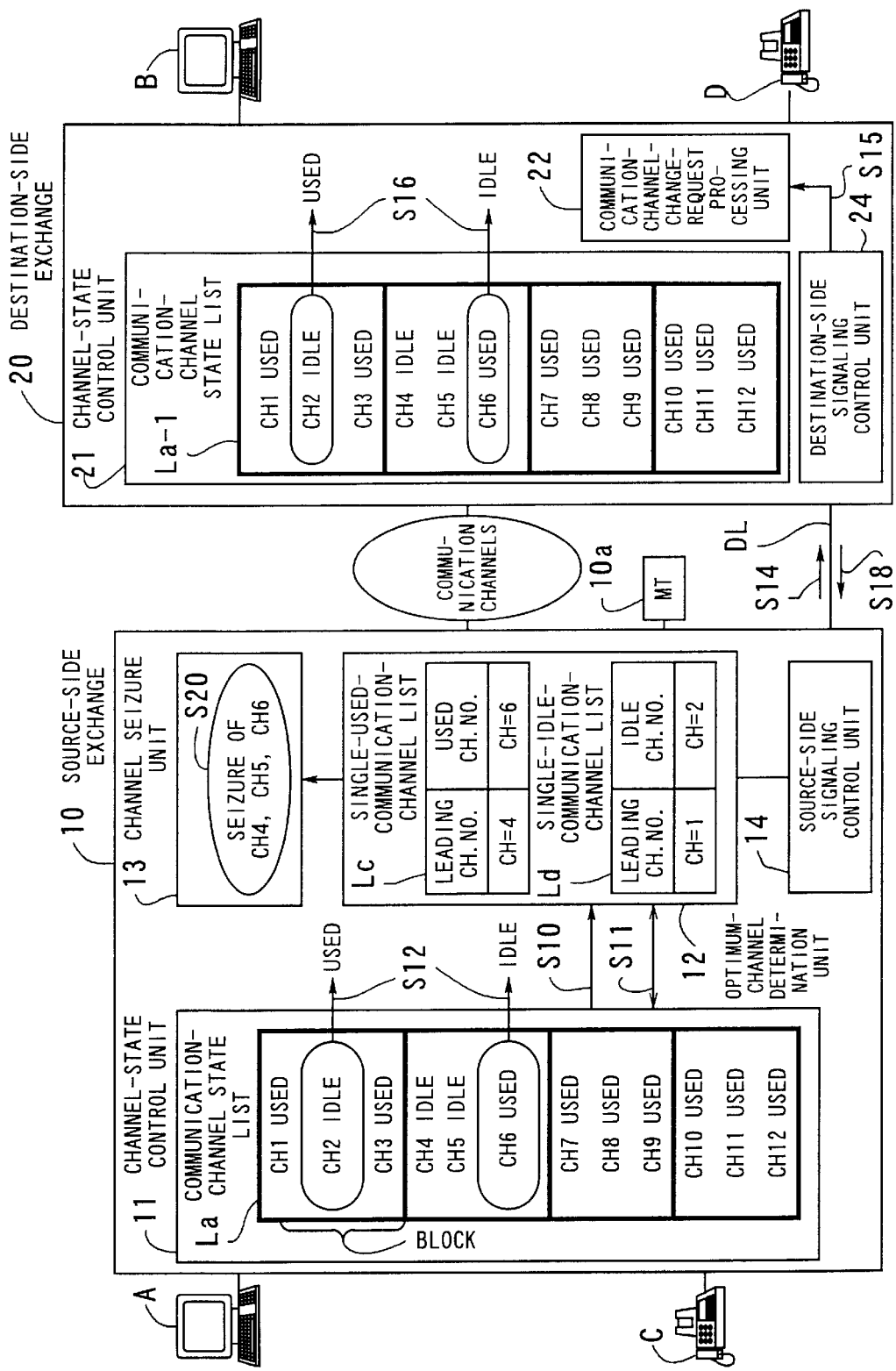
FIG. 3 is a block diagram illustrating the construction and the operations in the second embodiment.
Figure 4:
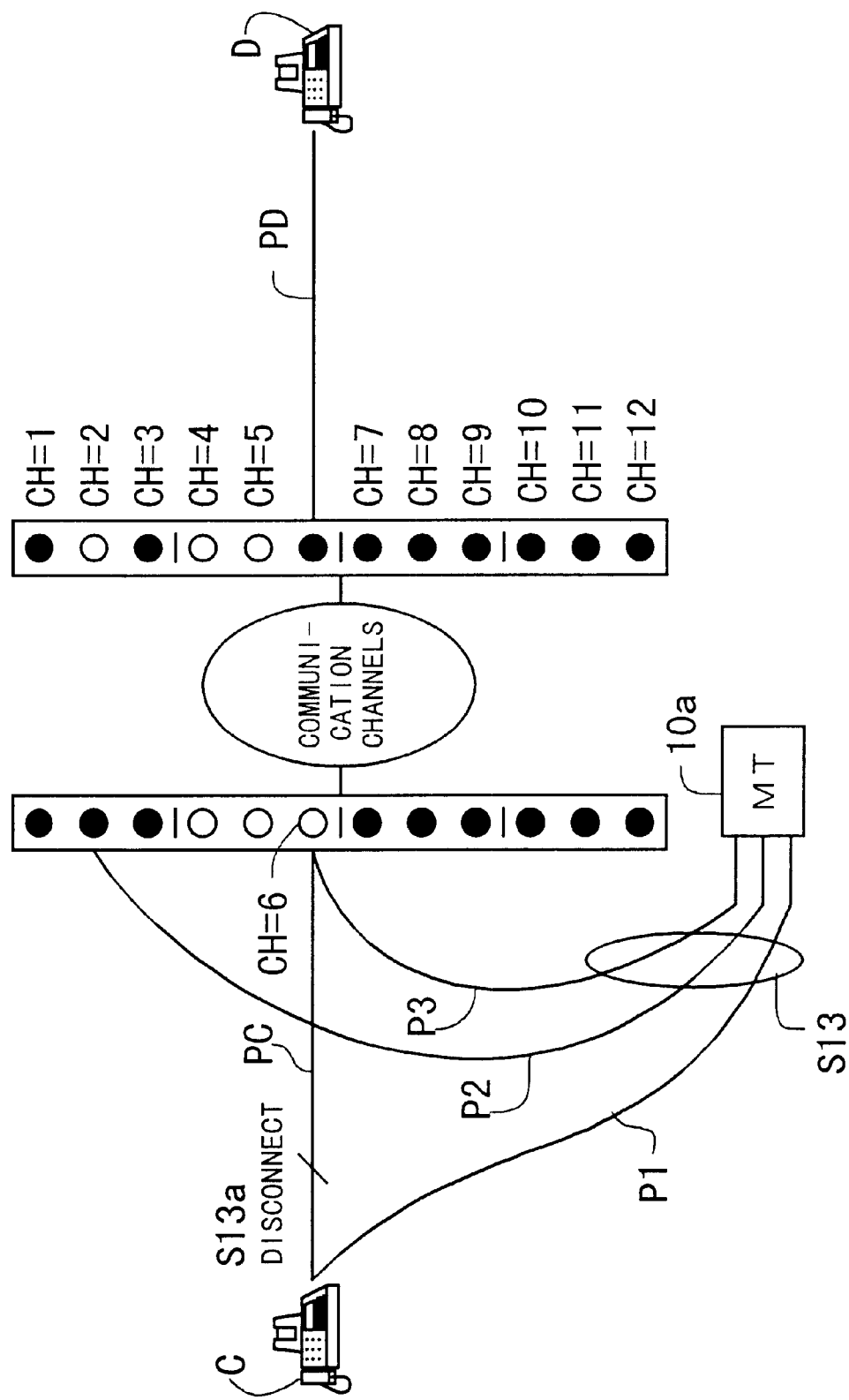

In the example of FIG. 3, the communication-channel state list La contains no block containing three idle communication channels, and therefore the channel-state control unit 11 notifies the optimum-channel determination unit 12 that the communication-channel state list La contains no block containing three idle communication channels.

[Step S11]

The optimum-channel determination unit 12 produces a single-used-communication-channel list Lc and a single-idle-communication-channel list Ld by referring to the communication-channel state list La.

The single-used-communication-channel list Lc holds information on one or more of the blocks in the communication-channel state list La when the one or more of the blocks each contain only one used communication channel. In practice, the single-used-communication-channel list Lc holds, for each of the one or more of the blocks, a leading communication channel number in the block and a communication channel number of the used communication channel. In the example of FIG. 3, the single-used-communication-channel list Lc holds information on the block containing the series of consecutive communication channels beginning from the communication channel CH4, and the information indicates that only one communication channel CH6 is used in the block.

The single-idle-communication-channel list Ld contains information on one or more of the blocks in the communication-channel state list La when the one or more of the blocks each contain only one idle communication channel. In practice, the single-idle-communication-channel list Ld holds, for each of the one or more of the blocks, a leading communication channel number in the block and a communication channel number of the idle communication channel. In the example of FIG. 3, the single-idle-communication-channel list Ld holds information on the block containing the series of consecutive communication channels beginning from the communication channel CH1, and the information indicates that only one communication channel CH2 is idle in the block.

[Step S12]

Based on the above contents in the single-used-communication-channel list Lc and the single-idle-communication-channel list Ld, the optimum-channel determination unit 12 changes, in the communication-channel state list La, the state indication for the communication channel CH2 from "idle" to "used", and the state indication for the communication channel CH6 from "used" to "idle", as illustrated in FIG. 3.

[Step S13]

In step S13, as a preparation for the channel change, the optimum-channel determination unit 12 seizes a mixing trunk 10a (FIG. 4) having a function realizing a three-party call. Then, the optimum-channel determination unit 12 connects the subscriber C with the mixing trunk 10a through a path P1, the mixing trunk 10a with the communication channel CH2 through a path P2, and the mixing trunk 10a with the communication channel CH6 through a path P3. Then, the optimum-channel determination unit 12 disconnects a path PC which connects the subscriber C with the communication channel CH6, as illustrated with reference S13a in FIG. 4, while the subscriber D and the communication channel CH6 are still connected with each other through a path PD at this stage.

[Step S14]

After the above preparation for the channel change is completed, the optimum-channel determination unit 12 sends a change request signal containing signaling information, through the source-side signaling control unit 14 in the source-side exchange 10 to the destination-side signaling control unit 24 in the destination-side exchange 20, for performing negotiation with the destination-side exchange 20, and waits for a change acknowledge signal from the destination-side exchange 20. The above signaling information contained in the change request signal includes information requesting for the change of the used communication channel from the communication channel CH6 to the communication channel CH2.

[Step S15]

When the destination-side signaling control unit 24 in the destination-side exchange 20 receives the above change request signal, the destination-side signaling control unit notifies the communication-channel-change-request processing unit 22 of the reception of the change request signal, and transfers the signaling information contained in the change request signal to the communication-channel-change-request processing unit 22.

[Step S16]

The communication-channel-change-request processing unit 22 reads out the communication channels (CH2 and CH6) to be changed, from the above signaling information, and rewrites state indications for the communication channels CH2 and CH6 in a communication-channel state list La-1 contained in a channel-state control unit 21 in the destination-side exchange 20, where the communication-channel state list La-1 and the channel-state control unit 21 in the destination-side exchange 20 have the same functions as the communication-channel state list La and the channel-state control unit 11 in the source-side exchange 10, respectively. The H above state indications for the communication channels CH2 and CH6 in the communication-channel state list La-1 it are rewritten corresponding to the changes (in step S12) of the state indications for the communication channels CH2 and CH6 in the communication-channel state list La in the source-side exchange 10. That is, the communication-channel-change-request processing unit 22 changes the state indication for the communication channel CH2 from "idle" to "used", and the state indication for the communication channel CH6 from "used" to "idle", as illustrated in FIG. 3.

[Step S17]

Figure 5:
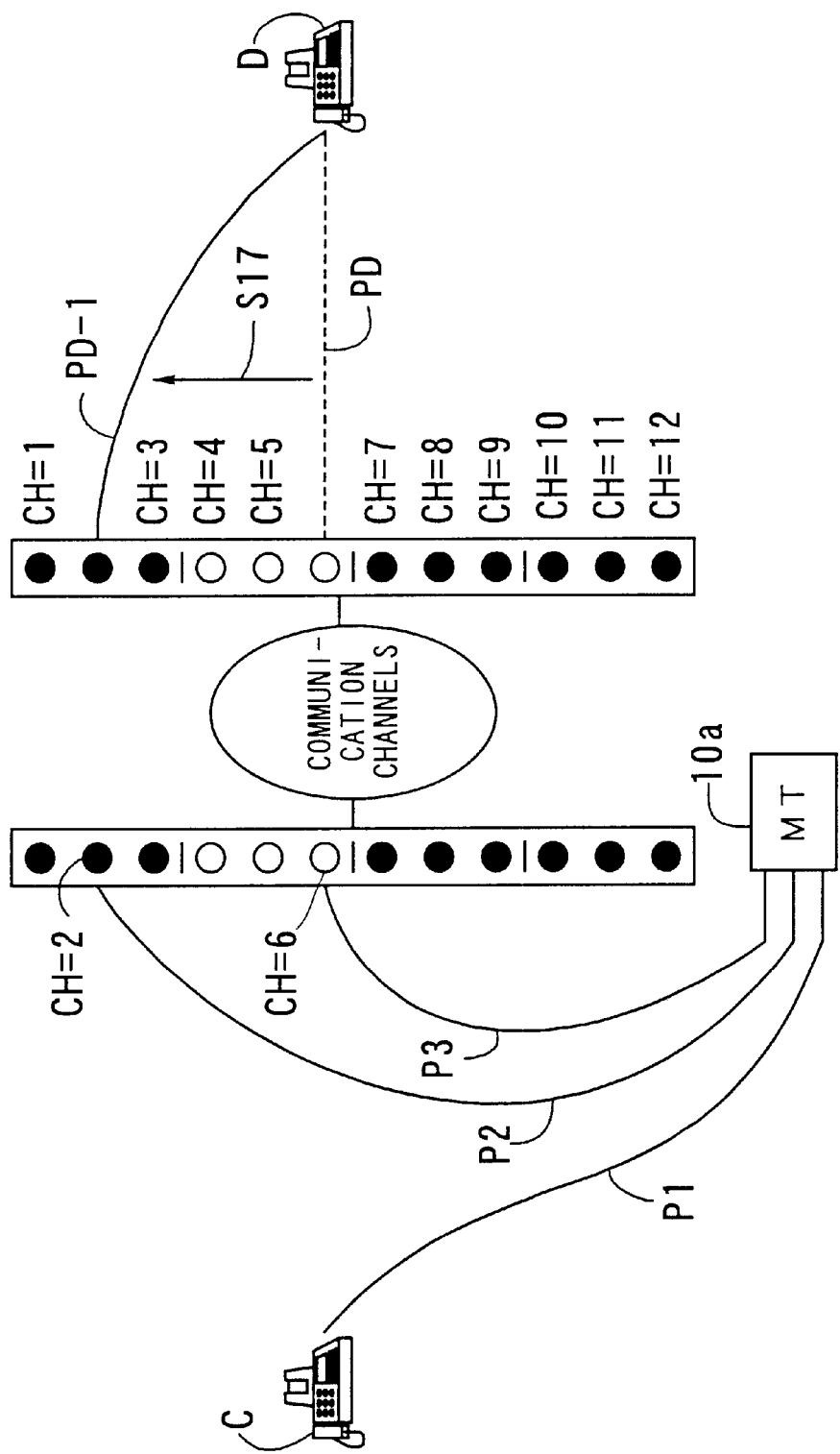
FIG. 5 is a diagram illustrating a configuration after completion of connection between the subscriber D and the communication channel CH2 in the exchange 200.

After the communication-channel state list La-1 is rewritten as above, the communication-channel-change-request processing unit 22 performs a channel change operation. That is, the communication-channel-change-request processing unit 22 disconnects the connection between the subscriber D and the communication channel CH6 through a path PD, and connects the subscriber D with the communication channel CH2 through a path PD-1, as illustrated in FIG. 5.

Since the subscriber C is connected to both the communication channels CH2 and CH6 through the mixing trunk 10a in the source-side exchange 10 during the above channel change operation in the destination-side exchange 20, communication between the subscribers C and D is not interrupted. After the channel change operation in the destination-side exchange 20 is completed, the subscribers C and D communicate with each other through H=the paths P1, P2, and PD-1.

[Step S18]

After the channel change operation in the destination-side exchange 20 is completed, the destination-side signaling control unit 24 sends the aforementioned change acknowledge signal to the source-side exchange 10.

[Step S19]

Figure 6:
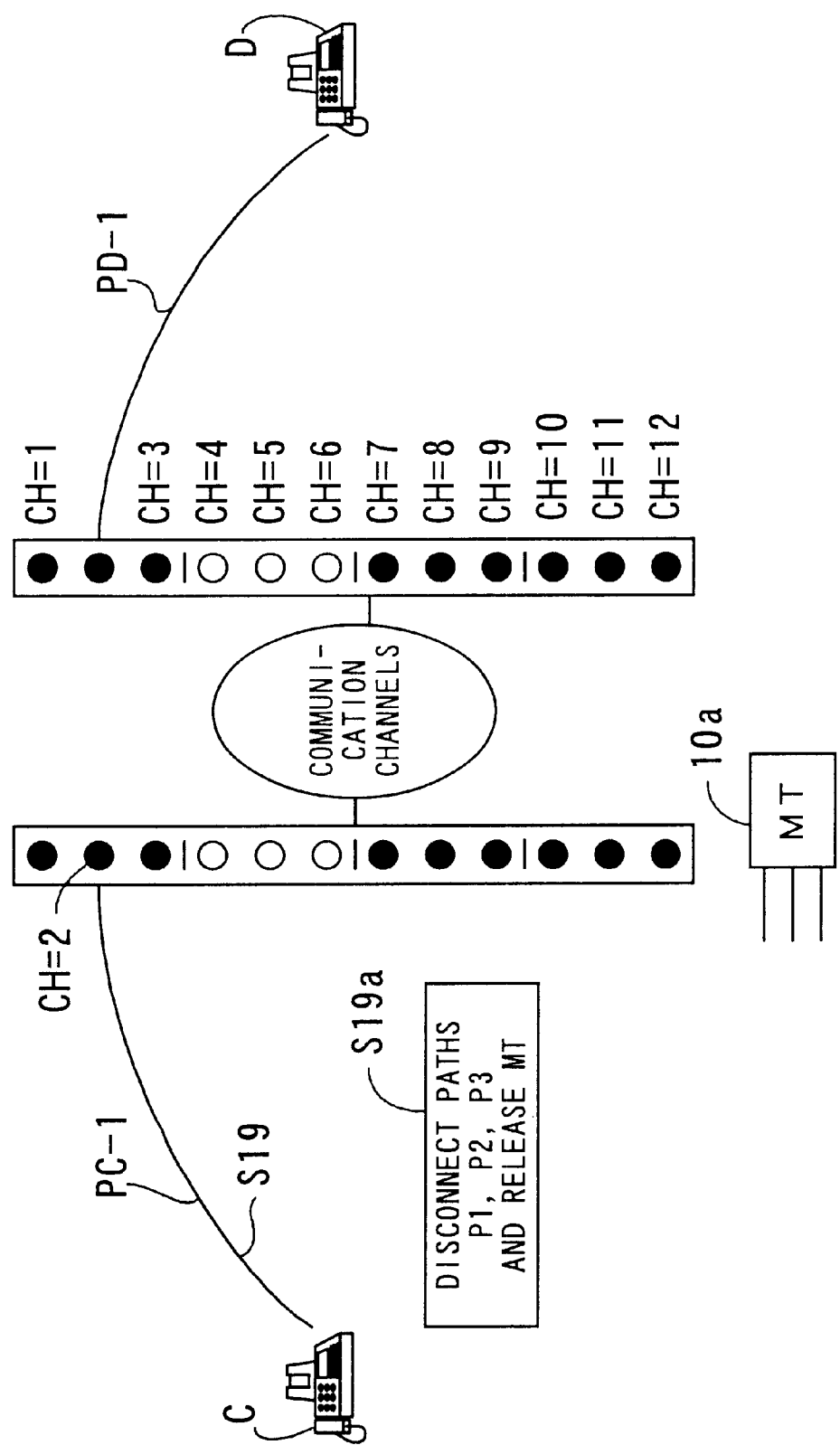
FIG. 6 is a diagram illustrating a configuration after completion of connections between the subscriber C and the changed communication channel CH2 in the exchange 100, and between the subscriber D and the changed communication channel CH2 in the exchange 200.

When the optimum-channel determination unit 12 in the source-side exchange 10 receives the above change acknowledge signal through the source-side signaling control unit 14, the optimum-channel determination unit 12 connects the subscriber C with the communication channel CH2 through a path PC-1, and disconnects the paths P1, P2, and P3, to release the mixing trunk 10a, as illustrated by reference S19a in FIG. 6.

[Step S20]

The channel seizure unit 13 seizes the communication channels CH4, CH5, and CH6, as illustrated in FIG. 3.

(4) Message Format

Figure 7A:
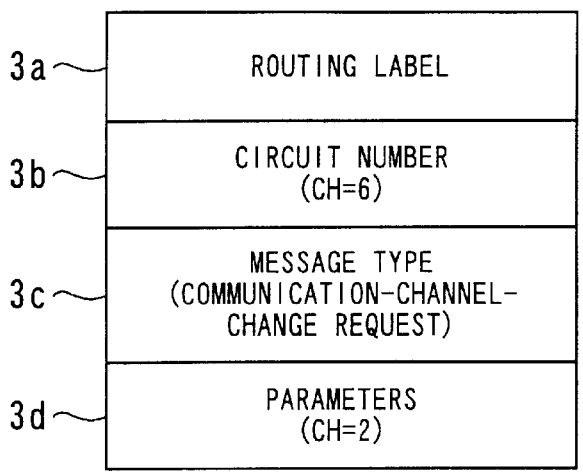
FIG. 7A shows a message format of the change request signal.
Figure 7B:
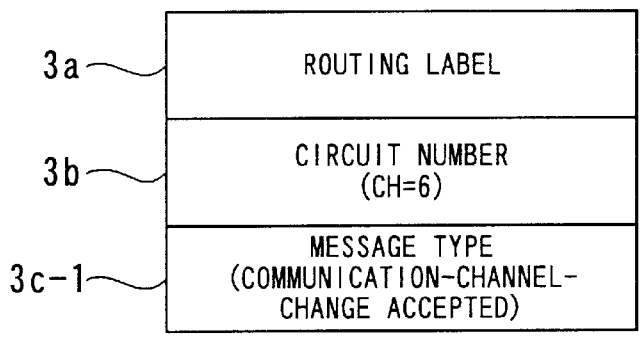
FIG. 7B shows a message format of the change acknowledge signal indicating acceptance of the request.
Figure 7C:
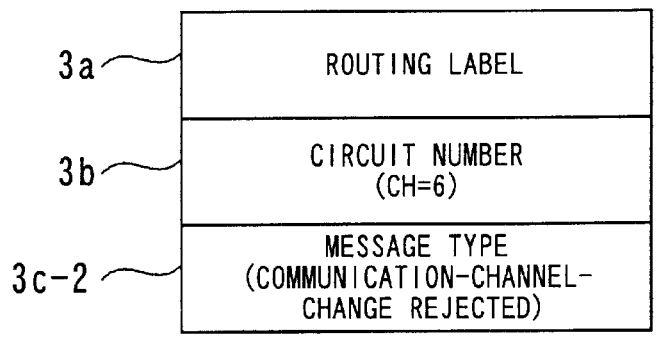
FIG. 7C shows a message format of the change acknowledge signal indicating unacceptance (rejection) of the request.

FIG. 7A shows a message format of the change request signal, FIG. 7B shows a message format of the change acknowledge signal indicating acceptance of the request, and FIG. 7C shows a message format of the change acknowledge signal indicating unacceptance (rejection) of the request.

In the data formats of FIGS. 7A to 7C, the routing label 3a is an identifier indicating an exchange from which the request originates, and the circuit number 3b indicates the channel number of the communication channel used for an existing call before the change. In the above operations in the second embodiment, the circuit numbers 3b in FIGS. 7A to 7C indicate the communication channel CH6.

The message type codes 3c, 3c-1, and 3c-2 in FIGS. 7A to 7C indicate a type of service provided by exchanges. In the above case 3, the message type code 3c in FIG. 7A indicates that the message is a communication channel change request, the message type code 3c-1 in FIG. 7B indicates that the message is a change acknowledge signal indicating acceptance of the request, and the message type code 3c-2 in FIG. 7C indicates that the message is a change acknowledge signal indicating unacceptance (rejection) of the request.

The parameter 3d in the format of FIG. 7A is one of signaling information elements defined by the ITU-T recommendation Q.763. In the case 3, the parameter 3d indicates the channel number of the communication channel used after the change. In the above case 3, the circuit numbers 3d in FIG. 7A indicates the communication channel CH2.

According to the constructions explained for the second embodiment, even when a series of consecutive idle communication channels for a requested multirate call is not immediately available, a required number of consecutive idle communication channels can be secured by flexibly changing allocation of a communication channel to a currently existing call so as to vacate the communication channel currently used for the existing call and allocate a currently idle communication channel to the existing call. Thus, communication channels can be used efficiently.

(5) Third Embodiment

Figure 8:
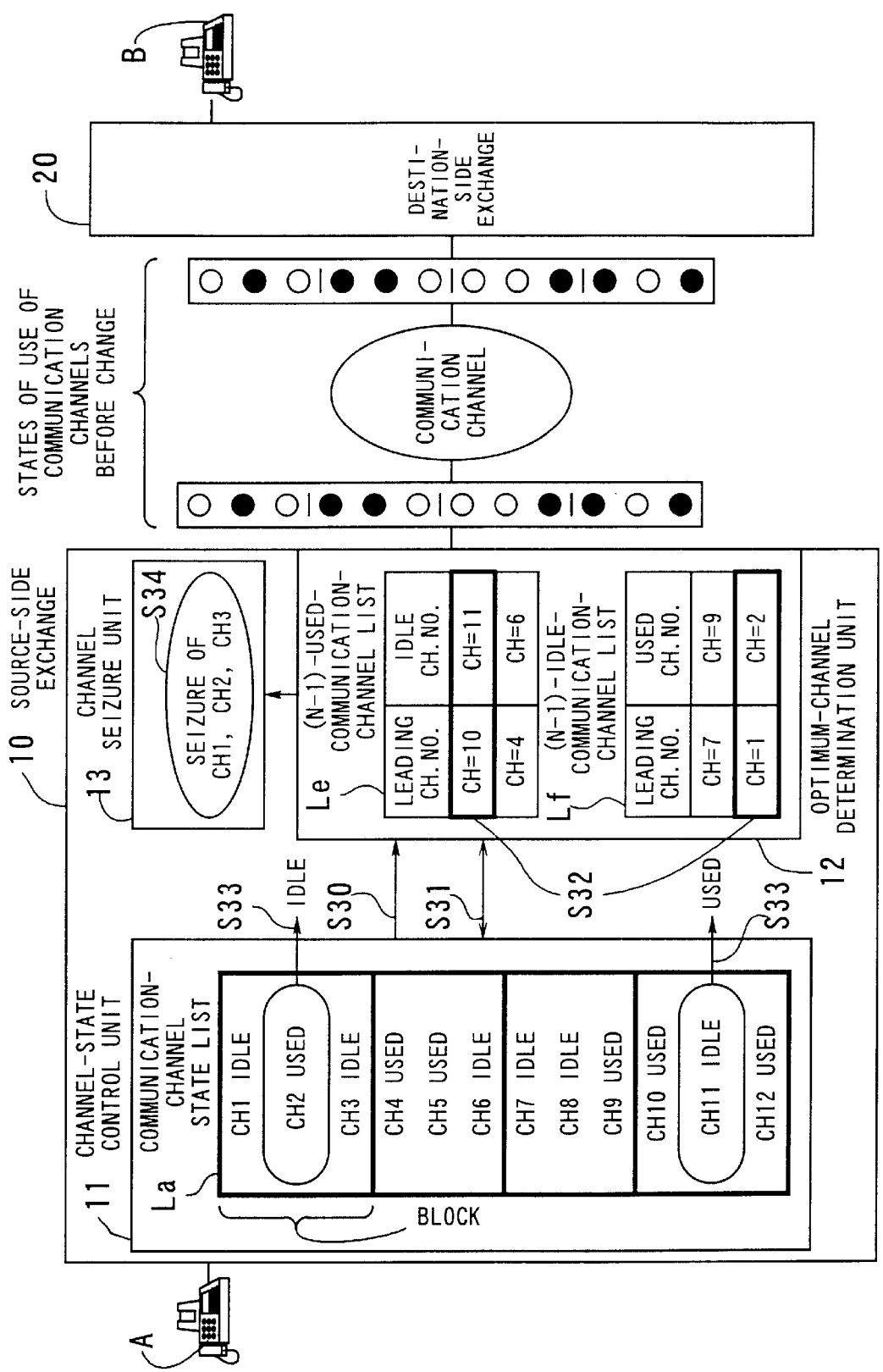
FIG. 8 is a diagram illustrating the construction and the operations in the third embodiment.

Next, referring to FIG. 8, explanations are provided for operations in the case wherein there are a plurality of ways (options) of changing allocation of a communication channel to an existing call. FIG. 8 is a diagram for explaining operations of selecting an optimum one of the plurality of ways of changing allocation of a communication channel to the existing call, in the third embodiment of the present invention.

First, a subscriber A connected to the source-side exchange 10 originates a multirate call to a subscriber B connected to the destination-side exchange 20, where the multirate call requires three communication channels.

[Step S30]

When the channel-state control unit 11 in the source-side exchange 10 receives a request for seizure of three communication channels for the multirate call from the subscriber A, the channel-state control unit 11 refers to the communication-channel state list La for searching for three consecutive idle communication channels in each of four blocks each containing entries for three communication channels.

In the example of FIG. 8, the communication-channel state list La contains no block containing three idle communication channels, and therefore the channel-state control unit 11 notifies the optimum-channel determination unit 12 that the communication-channel state list La contains no block containing three idle communication channels.

[Step S31]

The optimum-channel determination unit 12 produces an (N−1)-used-communication-channel list Le and an (N−1)-idle-communication-channel list Lf by referring to the communication-channel state list La.

The (N−1)-used-communication-channel list Le holds information on one or more of the blocks in the communication-channel state list La when the one or more of the blocks each contain N−1 used communication channel, where N is an integer indicating the number of communication channels required by the received multirate call, i.e., N=3 in this example. In practice, the (N−1)-used-communication-channel list Le holds, for each of the above one or more of the blocks, a leading communication channel number in the block and a communication channel number of the idle communication channel. In the example of FIG. 8, the (N−1)-used-communication-channel list Le holds information on two blocks. One of the two blocks contains information on the series of consecutive communication channels beginning from the communication channel CH10, and the information for the block indicates that only one communication channel CH11 is idle in the block. The other of the two blocks contains information on the series of consecutive communication channels beginning from the communication channel CH4, and the information for the block indicates that only one communication channel CH6 is idle in the block.

The (N−1)-idle-communication-channel list Lf contains information on one or more of the blocks in the communication-channel state list La when the one or more of the blocks each contain (N−1) idle communication channel. In practice, the (N−1)-idle-communication-channel list Lf holds, for each of the above one or more of the blocks, a leading communication channel number in the block and a communication channel number of the used communication channel. In the example of FIG. 8, the (N−1)-idle-communication-channel list Lf holds information on two blocks. One of the two blocks contains information on the series of consecutive communication channels beginning from the communication channel CH7, and the information for the block indicates that only one communication channel CH9 is used in the block. The other of the two blocks contains information on the series of consecutive communication channels beginning from the communication channel CH1, and the information for the block indicates that only one communication channel CH2 is used in the block.

[Step S32]

Based on the above contents in the (N−1)-used-communication-channel list Le and the (N−1)-idle-communication-channel list Lf, the optimum-channel determination unit 12 has to vacate one of the two used communication channels CH2 and CH9, and allocate one of the two idle communication channels CH6 and CH11 to an existing call which has used the vacated communication channel. That is, there are a plurality of ways (two options) of changing allocation of a communication channel to the existing call.

In this case, the optimum-channel determination unit 12 selects one of the plurality of ways which locates an used communication channel on the higher-number side and an unused communication channel on the lower-number side. In this example, the optimum-channel determination unit 12 selects a way in which the used communication channel CH2 is vacated and the idle communication channel CH11 is allocated to the existing call which has used the vacated communication channel CH2.

[Step S33]

The channel-state control unit 11 changes the state indication in the communication-channel state list La for the communication channel CH11 from "idle" to "used", and the state indication for the communication channel CH2 from "used" to "idle", as illustrated in FIG. 8.

[Step S34]

The operations as described in steps S13 to S19 are performed for actually disconnecting a connection through the communication channel CH2 for the existing call, and establishing a connection through the communication channel CH11 for the existing call. Then, the channel seizure unit 13 seizes the communication channels CH1, CH2, and CH3, as illustrated in FIG. 8.

According to the constructions explained for the third embodiment, when there are a plurality of ways (options) of changing allocation of a communication channel to the existing call, one of the plurality of ways is selected so that used communication channels gather together, and unused communication channels gather together. Thus, communication channels can be used further efficiently.

(6) Channel Reservation

Figure 9:
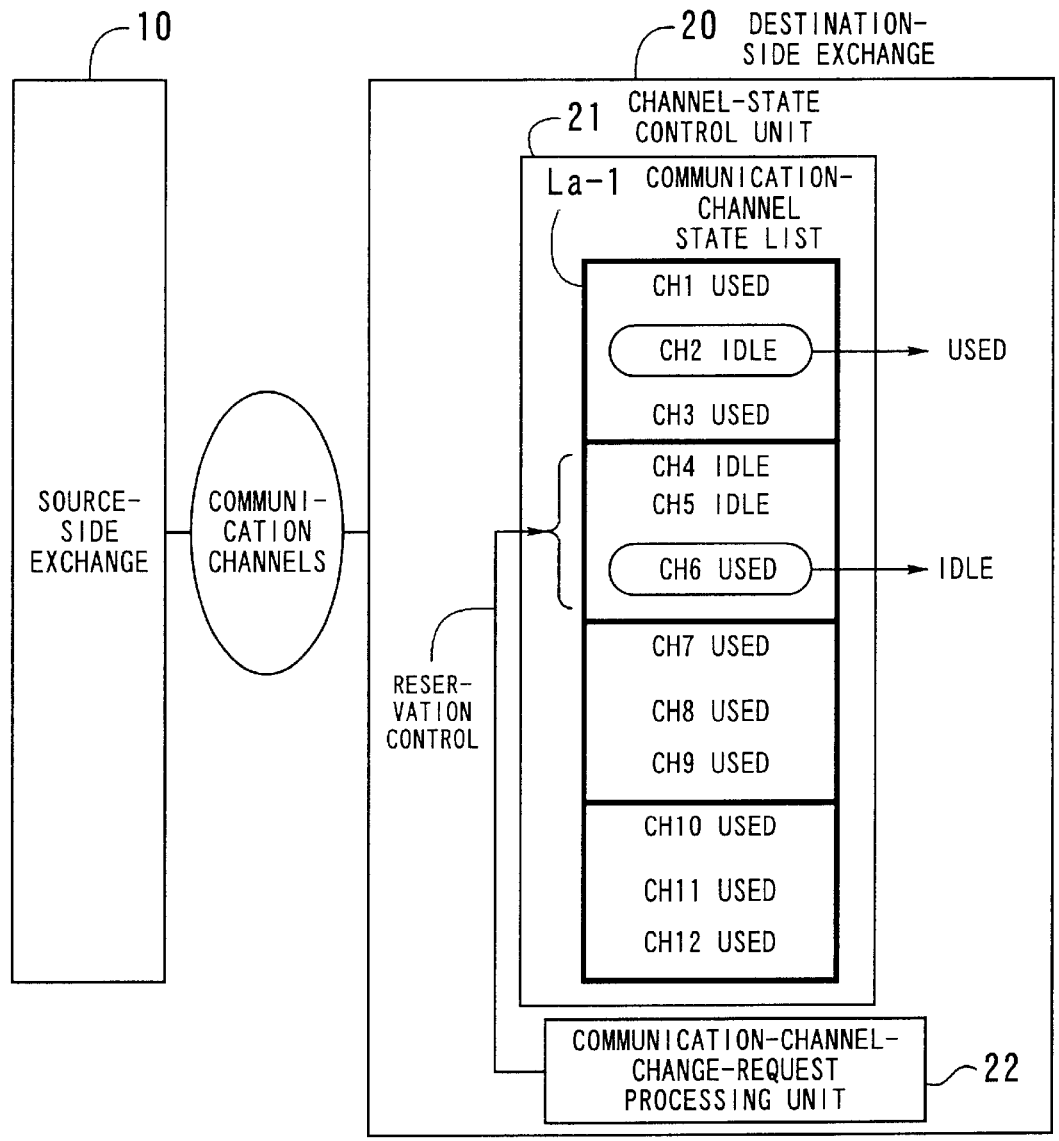
FIG. 9 is a diagram illustrating the operations of reservation control.

Next, referring to FIG. 9, explanations are provided for operations of reserving idle communication channels by the communication-channel-change-request processing unit 22 in the destination-side exchange 20. FIG. 9 is a diagram provided for explaining the operations of reserving the idle communication channels.

In the aforementioned step S16, the communication-channel-change-request processing unit 22 changes the state indication for the communication channel CH2 from "idle" to "used", and the state indication for the communication channel CH6 from "used" to "idle", as illustrated in FIG. 3. Thereafter, the communication channels CH4, CH5, and CH6 are seized by the channel seizure unit 13 in step S20. However, the communication channels CH4, CH5, and CH6 may be used for another call before seized by the channel seizure unit 13 for the multirate call requested in the second embodiment. Therefore, in order to prevent use of the communication channels CH4, CH5, and CH6 by a call other than the multirate call requested in the second embodiment, the communication-channel-change-request processing unit 22 reserves the communication channels CH4, CH5, and CH6 for the multirate call requiring three communication channels. For example, the communication-channel-change-request processing unit 22 writes an indication of a reserved state in the entries for the communication channels CH4, CH5, and CH6 in the communication-channel state list La-1.

In addition, the above reservation may be cancelled when the reserved communication channels are not seized in a predetermined time. The predetermined time may be counted by a timer provided for this purpose.

(7) Sequence of Seizing a Communication Channel

Figure 10:
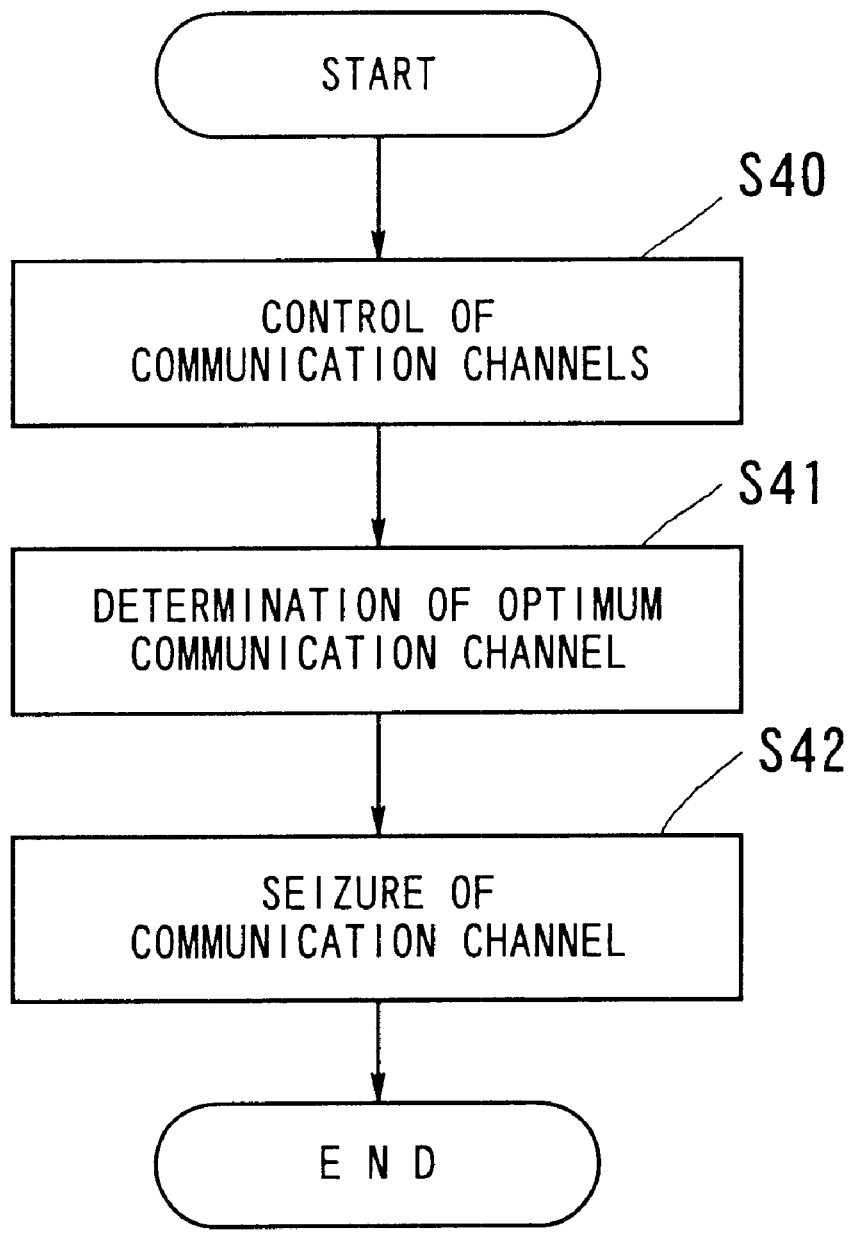
FIG. 10 is a diagram illustrating the basic sequence of the channel seizure method according to the present invention.
Figure 11A:
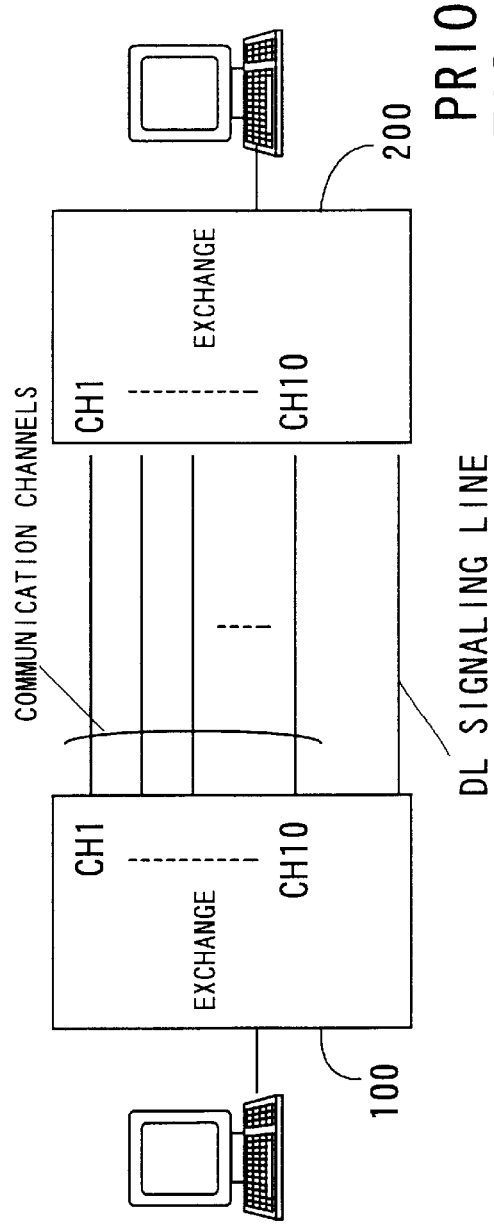
FIG. 11A is a diagram illustrating a construction of a communication system to which the present invention can be applied.
Figure 11B:
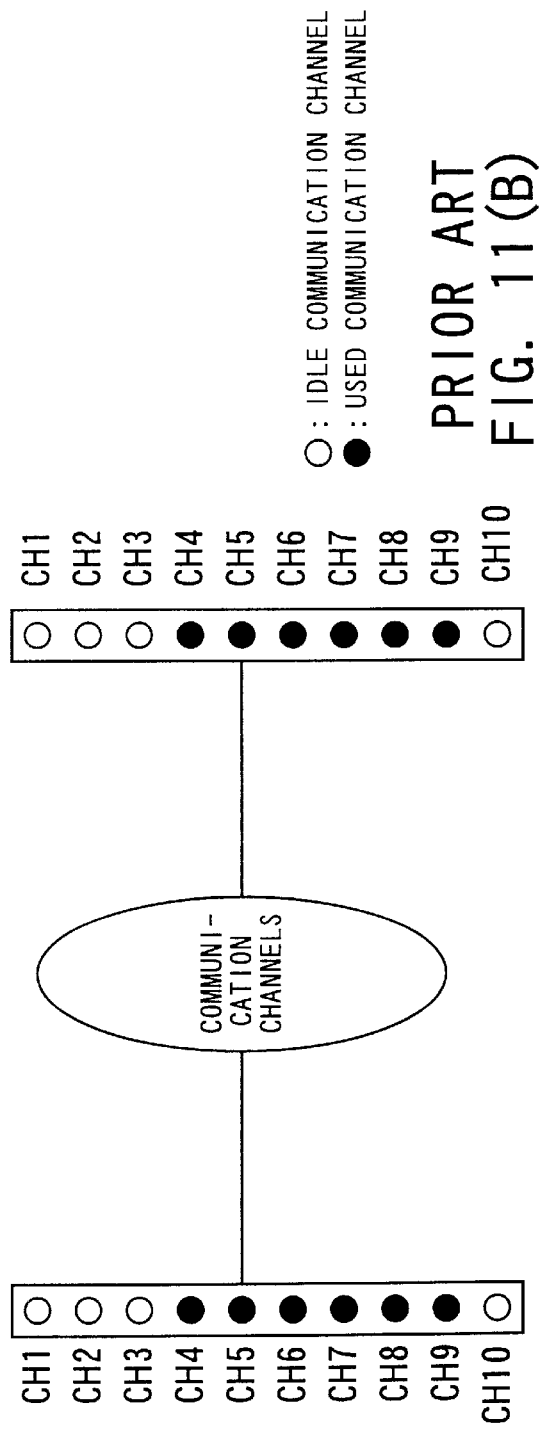
FIG. 11B is a diagram for schematically illustrating connection between exchanges 100 and 200 in FIG. 11A through a plurality of communication channels.

FIG. 10 is a diagram illustrating the basic sequence of the channel seizure method according to the present invention. As illustrated in FIG. 10, the channel seizure method according to the present invention comprises the following basic steps.

In step S40, states of communication channels are controlled.

In step S41, based on the above states of communication channels, one or more optimum communication channels to be seized for a newly requested call are determined so that after the operation of determining and seizing the one or more communication channels for the requested call, a further operation of seizing consecutive communication channels for another call can be successfully performed with high probability.

When the above newly requested call is a multirate call, and consecutive communication channels for the multirate call are not immediately available, a required number of consecutive communication channels may be secured by changing allocation of a communication channel to a currently existing call so as to vacate a currently used communication channel for use in the above multirate call and allocate an idle communication channel to the existing call.

In addition, when there are a plurality of optional ways of changing allocation of the communication channel to the currently existing call, one of the plurality of ways may be selected so that used communication channels gather together into a first group of consecutive communication channels, and idle communication channels gather together into a second group of consecutive communication channels.

Further, in the destination-side exchange, the communication channels vacated by the above change of allocation of a communication channel to a currently existing call are reserved until the communication channels are seized for the above multirate call.

Then, in step S42, the required number of consecutive communication channels are seized based on the determination in step S41.

(8) Advantages of the Present Invention

According to the channel seizure method and the channel seizure system of the present invention, one or more optimum communication channels to be seized for a newly requested call is determined so that after the operation of determining and seizing the one or more communication channels for the currently requested call, a further operation of seizing consecutive communication channels for another call can be successfully performed with high probability. Thus, channel allocation is optimized so that usability of idle communication channels in multirate calls is enhanced.

In addition, since a communication channel used for an existing call is vacated for the newly requested call by changing allocation of a communication channel to the existing call, usability of idle communication channels in multirate calls is further enhanced. That is, a multirate call which could not be established by the conventional technique can be established by the present invention.

Thus, according to the present invention, the call loss rate, the number of communication channels needed in the exchange, space needed for the exchange, and cost for equipment investment can be reduced.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

All of the contents of the Japanese patent application, No. 11-160644 are incorporated into this specification by reference.

What is claimed is:

1. A channel seizure system having a source-side exchange and a destination-side exchange, wherein said source-side exchange comprising:

a channel-state-information holding unit which holds information on a plurality of states of a plurality of communication channels, an optimum-channel determining unit which determines at least one optimum communication channel for use in a first call, from among said plurality of communication channels, based on said information on the plurality of states of the communication channels, a channel seizing unit which seizes said at least one optimum communication channel determined by the optimum-channel determining unit, and a source-side signaling control unit which transmits and receives signaling information;

said destination-side exchange comprising a destination-side signaling control unit which transmits and receives the signaling information; and said optimum-channel determining unit determines said at least one optimum communication channel for use in said first call so that a further operation of seizing consecutive communication channels for a second call can be successfully performed with high probability, after said optimum-channel determining unit determines said at least one optimum communication channel for the first call.

2. A channel seizure system according to claim 1, wherein said optimum-channel determining unit determines said at least one optimum communication channel for use in said first call so as to leave as long a series of consecutive idle communication channels as possible for use in said second call.

3. A channel seizure system according to claim 1, wherein said optimum-channel determining unit secures said at least one optimum communication channel by vacating one of said plurality of communication channels used in an existing call, and allocating an idle one of said plurality of communication channels to said existing call, when consecutive communication channels are required for said first call, and not immediately available.

4. A channel seizure system according to claim 3, wherein, when there are a plurality of optional ways of changing allocation of the communication channel to said existing call, said optimum-channel determining unit selects one of the plurality of ways for securing said at least one optimum communication channel, so that used communication channels gather together into a first group of consecutive communication channels, and idle communication channels gather together into a second group of consecutive communication channels.

5. A channel seizure system according to claim 1, wherein said destination-side exchange further comprises a channel-change-request processing unit which receives from said source-side exchange a request for changing allocation of a communication channel to an existing call, and changes the allocation of the communication channel to said existing call in response to the request.

6. A channel seizure system according to claim 5, wherein said channel-change-request processing unit treats one of said plurality of communication channels which is vacated by the operation of changing the allocation of the communication channel to said existing call, as a reserved communication channel.

7. A source-side exchange comprising:
- a channel-state-information holding unit which holds information on a plurality of states of a plurality of communication channels;
- an optimum-channel determining unit which determines at least one optimum communication channel for use in a first call, from among said plurality of communication channels, based on said information on the plurality of states of the communication channels;
- a channel seizing unit which seizes said at least one optimum communication channel determined by the optimum-channel determining unit; and
- a source-side signaling control unit which transmits and receives signaling information;
- said optimum-channel determining unit determines said at least one optimum communication channel for use in said first call so that a further operation of seizing consecutive communication channels for a second call can be successfully performed with high probability, after said optimum-channel determining unit determines said at least one optimum communication channel for the first call.

8. A source-side exchange according to claim 7, wherein said optimum-channel determining unit determines said at least one optimum communication channel for use in said first call so as to leave as long a series of consecutive idle communication channels as possible for use in said second call.

9. A source-side exchange according to claim 7, wherein said optimum-channel determining unit further secures said at least one optimum communication channel by vacating one of said plurality of communication channels used in an existing call, and allocating an idle one of said plurality of communication channels to said existing call, when consecutive communication channels are required for said first call, and not immediately available.

10. A source-side exchange according to claim 9, wherein, when there are a plurality of optional ways of changing allocation of the communication channel to said existing call, said optimum-channel determining unit selects one of the plurality of ways for securing said at least one optimum communication channel, so that used communication channels gather together into a first group of consecutive communication channels, and idle communication channels gather together into a second group of consecutive communication channels.

11. A channel seizure method for seizing at least one communication channel for use in a first call, comprising the steps of:
- (a) holding information on a plurality of states of a plurality of communication channels;
- (b) determining, as said at least one communication channel for use in said first call, at least one optimum communication channel from among said plurality of communication channels, based on said information on the plurality of states of the communication channels; and
- (c) seizing said at least one optimum communication channel determined in step (b);

the operation of step (b) is performed so that a further operation of seizing consecutive communication channels for a second call can be successfully performed with high probability, after the operations of steps (b) and (c) for the first call.

12. A channel seizure method according to claim 11, wherein the operation of step (b) is performed so as to leave as long a series of consecutive idle communication channels as possible for use in said second call.

13. A channel seizure method according to claim 11, further comprising the step of:
- (d) securing said at least one optimum communication channel to be determined in the step (b), by vacating one of said plurality of communication channels used in an existing call, and allocating an idle one of said plurality of communication channels to said existing call, when consecutive communication channels are required for said first call, and not immediately available.

14. A channel seizure method according to claim 13, wherein, when there are a plurality of optional ways of changing allocation of said communication channel to said existing call, one of the plurality of ways is selected for performing the operation of said step (d), so that used communication channels gather together into a first group of consecutive communication channels, and idle communication channels gather together into a second group of consecutive communication channels.

15. A channel seizure method according to claim 13, wherein said plurality of communication channels are provided for communication between a source-side exchange and a destination-side exchange, and said one of said plurality of communication channels vacated in the operation of step (d) is treated as a reserved communication channel in said destination-side exchange.

* * * * *